US010764107B2

(12) United States Patent
Li et al.

(10) Patent No.: US 10,764,107 B2
(45) Date of Patent: Sep. 1, 2020

(54) SESSION INITIATION METHOD AND DEVICE

(71) Applicant: Tencent Technology (Shenzhen) Company Limited, Shenzhen (CN)

(72) Inventors: Jingzhong Li, Shenzhen (CN); Hang Xiang, Shenzhen (CN); Bin Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/697,173

(22) Filed: Sep. 6, 2017

(65) Prior Publication Data
US 2017/0366389 A1 Dec. 21, 2017

Related U.S. Application Data

(63) Continuation-in-part of application No. PCT/CN2016/102370, filed on Oct. 18, 2016.

(30) Foreign Application Priority Data

Oct. 21, 2015 (CN) .......................... 2015 1 0690247

(51) Int. Cl.
*H04L 29/08* (2006.01)
*H04L 12/58* (2006.01)
*H04L 29/06* (2006.01)

(52) U.S. Cl.
CPC ........ *H04L 29/08585* (2013.01); *H04L 29/06* (2013.01); *H04L 29/06047* (2013.01);
(Continued)

(58) Field of Classification Search
CPC ............... H04L 29/06; H04L 29/06047; H04L 29/06095; H04L 29/08585; H04L 51/04;
(Continued)

(56) References Cited

U.S. PATENT DOCUMENTS

2003/0055981 A1* 3/2003 Requena ................. H04L 29/06 709/227
2004/0103157 A1* 5/2004 Requena ................. H04L 29/06 709/206
(Continued)

FOREIGN PATENT DOCUMENTS

| CN | 101079823 A | 11/2007 |
| CN | 101159901 A | 4/2008 |

(Continued)

OTHER PUBLICATIONS

RFC 2543, SIP: Session Initiation Protocol, Mar. 1999, https://tools.ietf.org/html/rfc2543#appendix-C (Year: 1999).*
(Continued)

*Primary Examiner* — David R Lazaro
(74) *Attorney, Agent, or Firm* — Morgan, Lewis & Bockius LLP

(57) ABSTRACT

Disclosed is an automatic telephonic session initiation method performed at a telephone session server including: receiving a telephonic session reservation request from a telephonic session client of a first terminal, the telephonic session reservation request including an identifier of an instant messaging client of a second terminal and a telephonic session initiation condition; storing corresponding reservation information according to the telephonic session reservation request; sending the reservation information to the instant messaging client of the second terminal according to the identifier of the instant messaging client of the second terminal; receiving a telephonic session reservation feedback message from the instant messaging client of the
(Continued)

second terminal; and sending a telephonic session initiation request to the telephonic session client of the first terminal and a telephonic session client of the second terminal according to the reservation information when the telephonic session initiation condition is satisfied.

16 Claims, 9 Drawing Sheets

(52) U.S. Cl.
CPC ............ *H04L 51/04* (2013.01); *H04L 51/043* (2013.01); *H04L 67/141* (2013.01); *H04L 67/146* (2013.01); *H04L 67/148* (2013.01); *H04L 67/42* (2013.01); *H04L 29/06095* (2013.01); *H04L 69/16* (2013.01)

(58) Field of Classification Search
CPC ... H04L 51/043; H04L 67/141; H04L 67/146; H04L 65/403; H04L 51/10; H04L 51/38; H04L 65/1069; H04L 65/1093; H04L 67/14; H04L 67/325; G06Q 10/1095; G06Q 10/109
See application file for complete search history.

(56) References Cited

U.S. PATENT DOCUMENTS

| | | | |
|---|---|---|---|
| 2007/0214217 A1* | 9/2007 | Ueno | ............... H04L 51/04 709/204 |
| 2012/0011205 A1* | 1/2012 | Paulsami | ........... G06Q 10/1095 709/206 |
| 2014/0051383 A1* | 2/2014 | Doerr | ................ H04W 4/16 455/405 |
| 2014/0082090 A1* | 3/2014 | Wodzinski | ........... G06Q 10/109 709/205 |
| 2014/0379827 A1 | 12/2014 | Eom et al. | |

FOREIGN PATENT DOCUMENTS

| | | |
|---|---|---|
| CN | 104683121 A | 6/2015 |
| CN | 105262750 A | 1/2016 |
| JP | H10150647 A | 6/1998 |
| JP | 2001298545 A | 10/2001 |
| JP | 2005190314 A | 7/2005 |
| JP | 2012085006 A | 4/2012 |
| JP | 2012165166 A | 8/2012 |
| JP | 2013192120 A | 9/2013 |
| JP | 2014021971 A | 2/2014 |

OTHER PUBLICATIONS

RFC 4916, Connected Identity in the Session Initiation Protocol (SIP), Jun. 2007, https://tools.ietf.org/html/rfc4916#section-2 (Year: 2007).*
RFC 3428, Session Initiation Protocol (SIP) Extension for Instant Messaging, Dec. 2002, https://tools.ietf.org/html/rfc3428 (Year: 2002).*
Tencent Technology, ISRWO, PCT/CN2016/102370,, dated Dec. 28, 2016, 8 pgs.
Tencent Technology, IPRP, PCT/CN2016/102370, dated Apr. 24, 2018, 7 pgs.

* cited by examiner

SESSION INITIATION METHOD AND DEVICE

PRIORITY CLAIM AND RELATED APPLICATION

This application is a continuation-in-part application of PCT/CN2016/102370, entitled "METHOD AND DEVICE FOR INITIATING SESSION" filed on Oct. 18, 2016, which claims priority to Chinese Patent Application No. 201510690247.5, filed with the State Intellectual Property Office of the People's Republic of China on Oct. 21, 2015, and entitled "METHOD AND DEVICE FOR INITIATING SESSION", both of which are incorporated herein by reference in their entirety.

FIELD OF THE TECHNOLOGY

The present disclosure relates to the field of communications technologies, and in particular, to a telephonic session initiation method and a device.

BACKGROUND OF THE DISCLOSURE

With development of communications technologies, voice call software based on a VoIP (Voice over Internet Protocol) technology has been more widely used. According to the VoIP technology, voice data is encoded and compressed by using a voice compression algorithm, the compressed voice data is packed according to a TCP/IP standard, a data packet is sent to a receive end by using an IP network, and voice data packets are stringed together and decompressed to recover an original voice signal, to transmit voice by using the Internet. By means of the VoIP technology, voice call software can cheaply transmit services such as voice, faxes, videos, and data on an IP network by widely employing an environment of the Internet and global IP-based interconnection, thereby providing more and better services than traditional services and bringing great convenience to users.

SUMMARY

The present disclosure provides a telephonic session initiation method and a device, to provide a flexible mechanism of telephonic session initiation.

The present disclosure provides an automatic telephonic session initiation method, including the following steps:

receiving, by a telephonic session server, a telephonic session reservation request from a telephonic session client of a first terminal, storing corresponding reservation information according to the telephonic session reservation request, and sending the reservation information to an instant messaging client of a second terminal by means of an instant messaging client of the first terminal;

receiving, by the telephonic session server, a telephonic session reservation feedback message from the second terminal; and sending, by the telephonic session server, a telephonic session initiation request to the telephonic session client of the first terminal and a telephonic session client of the second terminal according to the reservation information when a telephonic session initiation condition is satisfied.

The present disclosure further provides a telephonic session server, including:

a first receiving module, configured to receive a telephonic session reservation request from a telephonic session client of a first terminal;

a storage module, configured to store corresponding reservation information according to the telephonic session reservation request;

a first sending module, configured to send the reservation information to an instant messaging client of a second terminal by means of an instant messaging client of the first terminal;

a second receiving module, configured to receive a telephonic session reservation feedback message from the second terminal; and a second sending module, configured to send a telephonic session initiation request to the telephonic session client of the first terminal and a telephonic session client of the second terminal according to the reservation information when a telephonic session initiation condition is satisfied.

The present disclosure further provides a computer readable storage medium, including computer readable instructions; the instructions cause a processor in a first terminal to execute the following actions:

sending a telephonic session reservation request to a telephonic session server and receiving reservation information corresponding to the telephonic session reservation request from the telephonic session server;

providing the reservation information to an instant messaging client of a first terminal; and receiving a telephonic session initiation request from the telephonic session server and establishing a telephonic session connection with a telephonic session client of a second terminal according to the telephonic session initiation request, when a telephonic session initiation condition is satisfied.

In the present disclosure, reservation information is set on a telephonic session server and a telephonic session is initiated by the telephonic session server according to the reservation information. In this way, a user can customize factors, such as telephonic session time and telephonic session content, and extensibility of a multi-people telephonic session is implemented. Therefore, a user does not need to laboriously memorize a telephonic session to be initiated, thereby greatly improving user experience.

DESCRIPTION OF EMBODIMENTS

For brief and intuitive description, the following describes the solutions of the present disclosure by describing several typical embodiments. Details in the embodiments are merely used to help understand the solutions of the present disclosure. However, obviously, implementation of the technical solutions of the present disclosure may not be limited to these details. To avoid obscuring the solutions of the present disclosure, some implementation manners are not described in detail, but only a framework is given. In the following description, "including" means "including, but is not limited to", and "according to . . . " means "at least according to . . . , but is not limited to only according to . . . ". When a number of elements is not particularly specified in the following descriptions, it means that there may be one or more elements, or it may be understood that there is at least one element.

Figure 1:
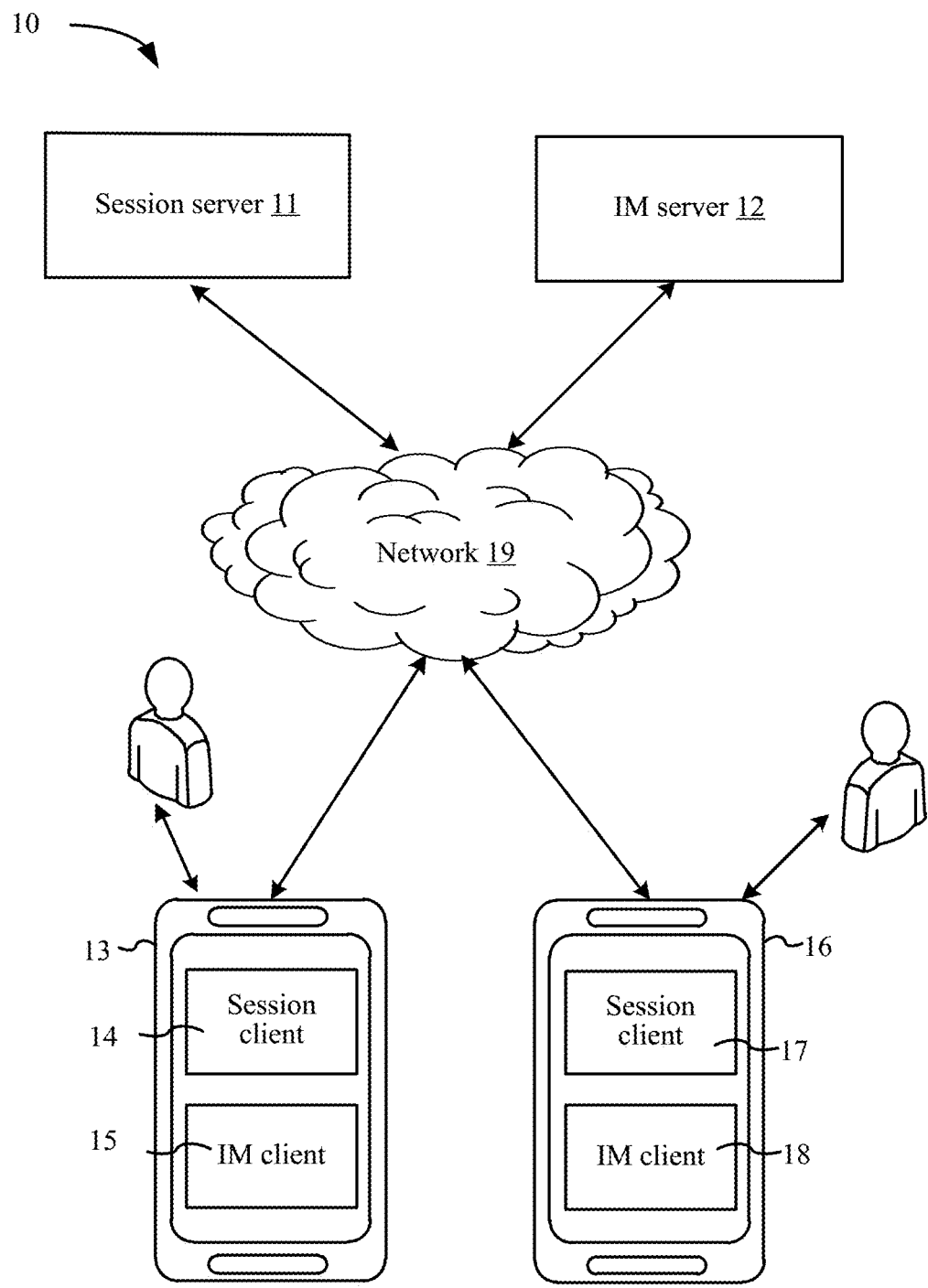
FIG. 1 is a schematic diagram of a network according to an embodiment of the present disclosure.

FIG. 1 is a schematic diagram of a communications system according to an embodiment of the present disclosure. As shown in FIG. 1, the communications system 10 includes: a telephonic session server 11, an instant messaging (IM) server 12, a terminal device 13, a terminal device 16, and a network 19. The terminal device 13 includes a telephonic session client 14 and an IM client 15. The terminal device 16 includes a telephonic session client 17 and an IM client 18.

The IM server 12 provides an instant messaging service for IM users and may include one or more physical devices. The IM server 12 may provide an open platform for a third party, so that the third party may send content to a contact, a communication group, or a personal home page of an IM user in an IM service by using an interface of the open platform.

The telephonic session server 11 provides a telephonic session service for users and may include one or more physical devices. The telephonic session service provided by the telephonic session server 11 may include: one-to-one, one-to-more, or more-to-more telephonic session services in a form of voice or video. The telephonic session server 11 may send a message to an IM user by using an interface provided by the IM server.

In some embodiments, the telephonic session server 11 and the IM server 12 are combined into one server providing both telephonic and instant messaging services. For example, the telephonic service may be a special type of service supported by the IM server 12 using the VoIP technology.

The terminal devices 13 and 14 may be various types of user devices, such as smartphones, tablet computers, or PDAs. The communications system 10 may include a large number of terminal devices. To be clear, only two terminals are used as an example for description in FIG. 1.

The IM client may provide an IM service for a user by means of communicating with the IM server, for example, sending a message to a contact, a communication group, or a personal home page (for example, WeChat moments and microblog home pages). The IM client may provide an interface for calling by another application in a same terminal device and obtain a message provided by the another application.

A telephonic session client may provide a telephonic session service for a user by means of communicating with a telephonic session server. The telephonic session client may be an application installed in a terminal device or may be provided by the telephonic session server in a form of a web page to a browser in the terminal device and displayed by the browser in the terminal device. The telephonic session client may further provide an interface for calling by another application, and receive a message sent by the another application.

In some embodiments, the telephonic session client and the IM client may be integrated into one client-side application that can support both telephonic service and instant messaging service. In some other embodiments, the telephonic session client and the IM client are two separate client-side applications, each having its own unique identifier and associated contact list. For example, the telephonic session client may be identified a unique telephone number of a corresponding terminal device and the IM client of the terminal device may have a unique identity registered with the IM server 12 so that the user of the IM client can exchange instant messages with others on its contact list.

In some embodiments, the telephonic session server 11 and/or the IM server 12 maintain a mapping relationship for a pair of a telephonic session client's identity and a corresponding IM client's identity for each terminal device. Such mapping relationship is pushed down to the terminal devices supported by the telephonic session server 11 and the IM server 12 such that each telephonic session client can access the corresponding IM client's identity for each member in the contact list of the telephonic session client and each IM client can access the corresponding telephonic session client's identity for each member in the contact list of the IM client. By doing so, the telephonic session server 11 and the IM server 12 can use one of the two services to supplement the other service. For example, when one user of a terminal device is on another telephone call and therefore cannot join a prior scheduled conference call, the user's rejection or postpone request can be delivered to the other participants of the conference call via their respective IM clients.

The telephonic session server 11 not only may enable a user to initiate an instant call, but also may implement a call reservation. For example, the telephonic session server 11 may store reservation information after receiving a reservation request sent by a first telephonic session client, and send the reservation information to a second telephonic session client specified in the reservation request; after receiving a reservation feedback sent by the second telephonic session client, when a telephonic session initiation condition specified in the reservation information is satisfied, send a telephonic session initiation request to the first telephonic session client and the second telephonic session client, so as to establish a telephonic session between the first telephonic session client and the second telephonic session client.

To implement telephonic sessions, a contact list may be stored in the telephonic session client, and identifications (such as a user name, a phone number, and an email address)

of each contact of a user in a telephonic session system are recorded in the contact list. Users may select an invited object from the contact list in the telephonic session client and initiate a telephonic session request.

Figure 2:
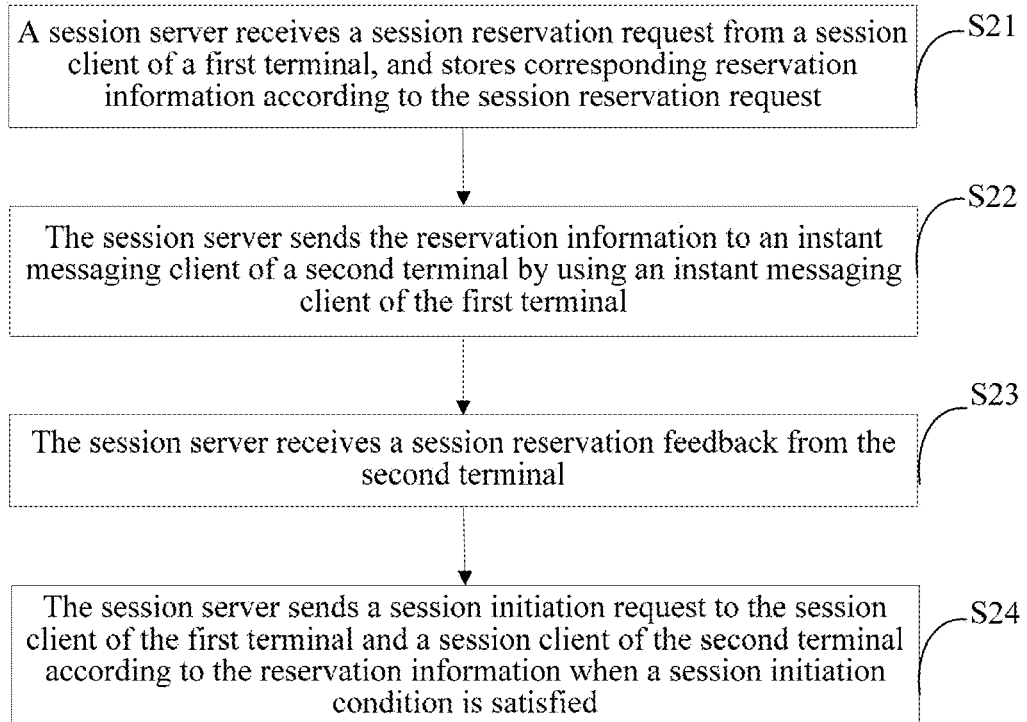
FIG. 2 is a flowchart of a telephonic session initiation method according to an embodiment of the present disclosure.

The telephonic session system of the present application may further allow users to select an invited object and send the reservation information by using a third-party service system (for example, an IM system). FIG. 2 is a flowchart of a telephonic session initiation method according to an embodiment of the present disclosure. As shown in FIG. 2, the method 20 may include the following steps:

Operation S21. A telephonic session server receives a telephonic session reservation request from a telephonic session client of a first terminal, and stores corresponding reservation information according to the telephonic session reservation request. In some embodiments, the telephonic session reservation request includes an identifier of a telephonic session client of a second terminal (e.g., a telephone number), an identifier of an instant messaging client of the second terminal (e.g., the user identifier of the instant messaging client at the IM server) and a telephonic session initiation condition, such as the date of the telephonic session and the duration of the telephonic session, a passcode of the telephonic session, etc.

Operation S22. The telephonic session server sends the reservation information to an instant messaging client of a second terminal by using an instant messaging client of the first terminal. In some embodiments, the reservation information is sent to the instant messaging client of the second terminal according to the identifier of the instant messaging client of the second terminal. In other words, the reservation information appears, as a text message, in an online chat between an instant messaging client of the first terminal and the instant messaging client of the second terminal. For example, the telephonic session server may generate a link associated with the reservation information and provide the link to the instant messaging client of the first terminal, e.g., in the form of a text message in the text editing box of the instant messaging client of the first terminal. The instant messaging client of the first terminal then sends a message including the link associated with the reservation information to the instant messaging client of the second terminal according to the identifier of the instant messaging client of the second terminal. In some embodiments, the user of the instant messaging client of the first terminal may add additional information to the text message, which will be sent together to the instant messaging client of the second terminal. Alternatively, the telephonic session server may generate a link associated with the reservation information and provide the link to the instant messaging server. The instant messaging server then sends a text message including the link associated with the reservation information to both the instant messaging client of the first terminal and the instant messaging client of the second terminal.

Operation S23. The telephonic session server receives a telephonic session reservation feedback message from the second terminal. In some embodiments, the telephonic session reservation feedback message is returned from the instant messaging client of the second terminal. Upon receipt of the message, the telephonic session server, either directly or via the instant messaging server, forwards the telephonic session reservation feedback message to an instant messaging client of the first terminal. For example, the telephonic session reservation feedback message may appear as a text message in the online chat between the two instant messaging clients, serving as a notification to the user of the first terminal that the user of the second terminal has accepted the invitation to participate in the reserved telephonic session.

In some embodiments, the user of the second terminal can propose a change to the reserved telephonic session, e.g., due to a time conflict, by sending an update to the reservation information from the instant messaging client of the second terminal, e.g., in the form of a text message. Upon receipt of the text message, the telephonic session server, either directly or via the instant messaging server, updates the reservation information according to the change proposed by the user of the second terminal and then forwards the updated reservation information to the instant messaging client of the first terminal to make sure that the user of the first terminal or another party invited to participate in the telephonic session is aware of the change proposed by the user of the second terminal and agrees to such changes. Such updates also appear in the form of text messages in respective online chats supported by the instant messaging server. If the user of the first terminal agrees to the changes, the user may return, to the telephonic session server, another an update confirmation from the instant messaging client of the first terminal, which is then forwarded by the telephonic session server to the instant messaging client of the second terminal to complete the process of reserving a telephonic session involving multiple participants using their respective telephonic session clients and instant messaging clients. Note that the process of reserving the telephonic session can also be used for updating a reserved telephonic session when one of the participants subsequently cannot attend the initially reserved telephonic session but would like to propose a telephonic session postpone request from the instant messaging client of the terminal device used by the participant.

Operation S24. The telephonic session server sends a telephonic session initiation request to the telephonic session client of the first terminal and a telephonic session client of the second terminal according to the reservation information when a telephonic session initiation condition is satisfied (e.g., when it is the scheduled time for the telephonic session).

In this case, the telephonic session server may send the reservation information to an IM client of an invitee (that is, the IM client of the second terminal) by using an IM client of an inviter (that is, the IM client of the first terminal), so as to send the reservation information to the invitee by using the IM system. Therefore, the reservation information can be transmitted fast in real time.

In the embodiments, the telephonic session server may generate, in operation S22, a link associated with the reservation information, and provide the link to the instant messaging client of the first terminal.

Figure 3:
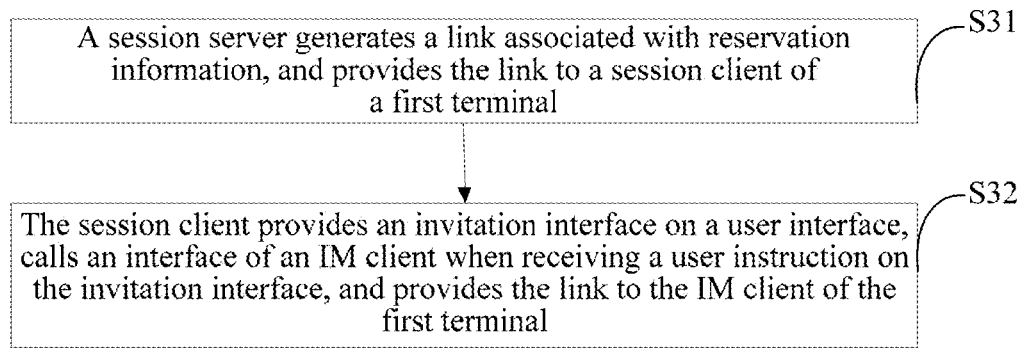
FIG. 3 is a flowchart of a telephonic session initiation method according to an embodiment of the present disclosure.

In some examples, the telephonic session server may provide the link to the telephonic session client of the first terminal, and the telephonic session client of the first terminal provides the link to the instant messaging client of the first terminal, so that the instant messaging client of the first terminal sends the link to the instant messaging client of the second terminal. FIG. 3 is a flowchart of a telephonic session initiation method according to an embodiment of the present disclosure. As shown in FIG. 3, the method 30 may include the following steps:

Operation S31. A telephonic session server generates a link associated with reservation information, and provides the link to a telephonic session client of a first terminal.

In some examples, the telephonic session server may generate a web page including the reservation information and provide the link directing to the web page to the telephonic session server. In some examples, the link may direct to an instruction that is used to call the IM client interface and that includes the reservation information. In other examples, the link may further direct to other data relevant to the reservation information.

Operation S32. The telephonic session client provides an invitation interface on a user interface, calls an interface of an IM client when receiving a user instruction on the invitation interface, and provides the link to the IM client of the first terminal.

The interface may be an icon or a button, and prompts a user "to invite friends in xx". When a user clicks the interface, the telephonic session client triggers, by calling the interface, the IM client corresponding to the interface. There may be one or more interfaces and multiple interfaces may separately correspond to different IM clients.

In this example, a user may select a contact in the IM system as an invited object of a telephonic session, so that the user can conveniently perform use.

Figure 4:
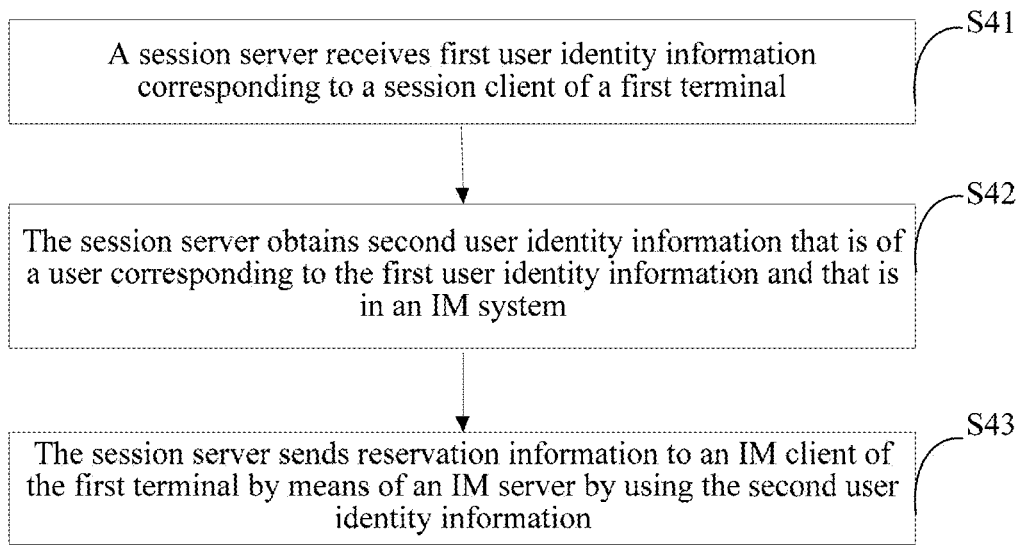
FIG. 4 is a flowchart of a telephonic session initiation method according to an embodiment of the present disclosure.

In some examples, the telephonic session server may provide the link to the IM client of the first terminal by using the IM server, so that the IM client of the first terminal sends the link to the IM client of the second terminal. FIG. 4 is a flowchart of a telephonic session initiation method according to an embodiment of the present disclosure. As shown in FIG. 4, the method 40 may include the following steps:

Operation S41. A telephonic session server receives first user identity information corresponding to a telephonic session client of a first terminal.

Operation S42. The telephonic session server obtains second user identity information that is of a user corresponding to the first user identity information and that is in an IM system.

Operation S43. The telephonic session server sends reservation information to an IM client of the first terminal by means of an IM server by using the second user identity information.

In this example, the telephonic session server sends a link associated with the reservation information to the IM client of the first terminal, so that a user may perform an operation in the IM client, such as sharing the link in an IM chat to invite contacts in the IM system.

In all examples, the telephonic session reservation feedback message received by the telephonic session server in Operation S23 from the second terminal may come from the telephonic session client of the second terminal or the IM client of the second terminal.

In some examples, the telephonic session server may receive the telephonic session reservation feedback message sent by the IM client of the second terminal by using the link. For example, when the IM client of the second terminal detects operations of users on the link, the IM client of the second terminal sends the telephonic session reservation feedback message to the telephonic session server according to the link. After receiving the telephonic session reservation feedback message, the telephonic session server may obtain, from the IM server, an identity of the IM user accessing the link, and determine a user identity of the IM user in the telephonic session system by using the identity of the IM user. For another example, the IM client of the second terminal uses a browser to obtain and display the web page that the link directs to, and sends the telephonic session reservation feedback message to the telephonic session server according to operations of users on elements of the web page. The telephonic session server may obtain a user identity of a user in the telephonic session system by using an operation of login to the telephonic session system in the web page.

In some examples, the telephonic session server may receive the telephonic session reservation feedback message that is sent by the telephonic session client of the second terminal after the telephonic session client of the second terminal is triggered by the IM client of the second terminal by using the link. For example, after the IM client of the second terminal receives the operation of the user on the link, the IM client of the second terminal calls the interface of the telephonic session client of the second terminal according to the link and provides the link to the telephonic session client of the second terminal. The telephonic session client of the second terminal displays the corresponding reservation information to a user according to the link and sending the telephonic session reservation feedback message to the telephonic session server according to an instruction of the user.

In all examples, after receiving the telephonic session reservation feedback message, the telephonic session server may associate the user identity of the user sending the telephonic session reservation feedback message in the telephonic session system with the reservation information stored in the telephonic session server, so that a telephonic session can be conveniently initiated subsequently.

Figure 5:
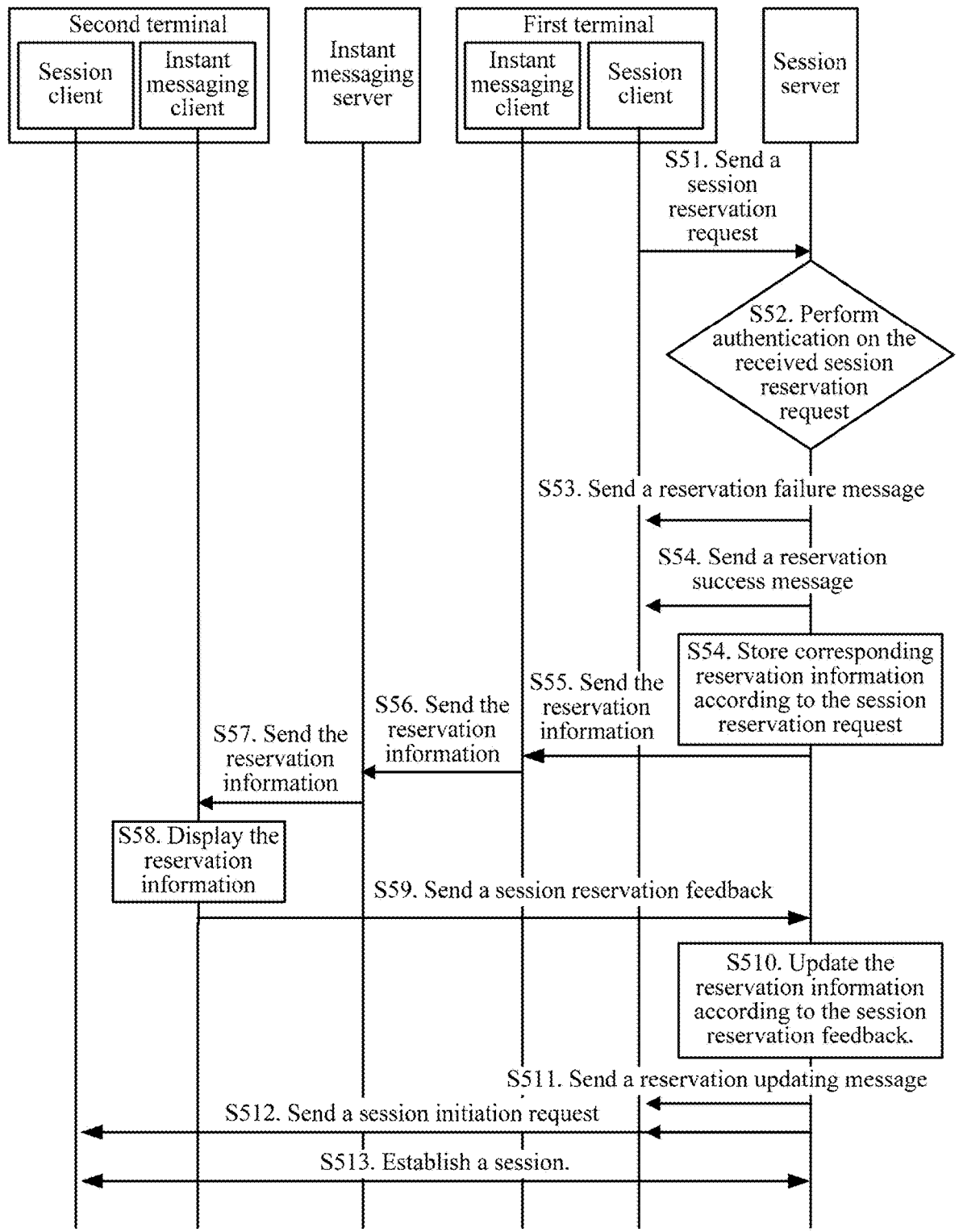
FIG. 5 is a flowchart of a telephonic session initiation method according to an embodiment of the present disclosure.

An embodiment of present disclosure provides an automatic telephonic session initiation method. As shown in FIG. 5, the method is applied to a system including a first terminal, a second terminal, an instant messaging server, and a telephonic session server. A telephonic session client and an instant messaging client are installed in each of the first terminal and the second terminal. The method includes the following steps:

Operation S51. A telephonic session client of a first terminal sends a telephonic session reservation request to a telephonic session server.

Specifically, after the telephonic session client of the first terminal is started, the telephonic session reservation request is generated according reservation content selected by a user and the telephonic session reservation request is sent to the telephonic session server.

The telephonic session reservation request may include a reservation user identity and a telephonic session initiation condition, and may further include a telephonic session end condition and a telephonic session theme.

Figure 6:
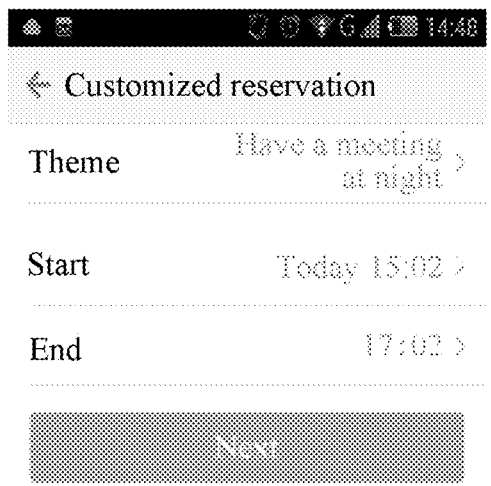
FIG. 6 is a schematic diagram of an interface of selecting reservation content according to an embodiment of the present disclosure.

In the embodiment, the reservation user identity is a phone number of an account bound when the user login to the telephonic session client of the first terminal. The user selects an interface of the reservation content in the telephonic session client of the first terminal, as shown in FIG. 6.

Operation S52. The telephonic session server performs authentication on the received telephonic session reservation request; if authentication succeeds, perform operation S54; if authentication fails, perform operation S53.

Specifically, the telephonic session server parses the received telephonic session reservation request and determines whether content in the telephonic session reservation request is legal; if the content is legal, it is determined that the telephonic session reservation request has been authenticated; if the content is illegal, it is determined that the telephonic session reservation request has not been authenticated.

In this embodiment, the telephonic session server may determine whether the reservation user identity in the telephonic session reservation request is legal; if the reservation user identity in the telephonic session reservation request is legal, it is determined that the telephonic session reservation request has been authenticated; if the reservation user identity in the telephonic session reservation request is illegal, it is determined that the telephonic session reservation request has not been authenticated. Alternatively, the telephonic session server may determine whether the telephonic session initiation condition in the telephonic session reservation request is legal; if the telephonic session initiation condition is legal, it is determined that the telephonic session reservation request has been authenticated; if the telephonic session initiation condition is illegal, it is determined that the telephonic session reservation request has not been authenticated.

Operation S53. The telephonic session server sends a reservation failure message to the telephonic session client of the first terminal.

Operation S54. The telephonic session server sends a reservation success message to the telephonic session client of the first terminal and stores corresponding reservation information according to the telephonic session reservation request.

Specifically, the telephonic session server may store the reservation user identity in the telephonic session reservation request into the reservation information as a telephonic session user identity, and stores the telephonic session initiation condition in the telephonic session reservation request into the reservation information.

The reservation information may include the telephonic session user identity and the telephonic session initiation condition, and may further include a telephonic session end condition and a telephonic session theme.

In this embodiment, the telephonic session initiation condition may be from a current time to a preset telephonic session initiating time; the a telephonic session end condition may be from a current time to a preset telephonic session ending time, or may be that a number of users that participate in the telephonic session is less than a second preset number, or may be other conditions.

Operation S55. The telephonic session server sends the reservation information to an instant messaging client of the first terminal.

Operation S56. The instant messaging client of the first terminal sends the reservation information to an instant messaging server.

Operation S57. The instant messaging server sends the reservation information to an instant messaging client of a second terminal.

Operation S58. The instant messaging client of the second terminal displays the reservation information.

Figure 7:
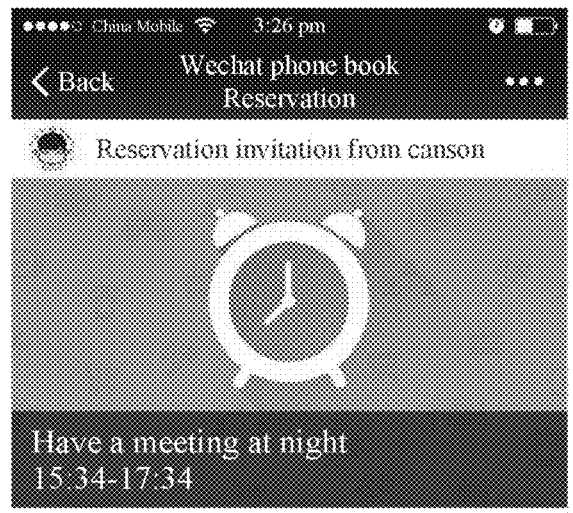
FIG. 7 is a schematic diagram of an interface of displaying reservation information according to an embodiment of the present disclosure.

For example, the instant messaging client of the second terminal displays the reservation information in a start state, as shown in FIG. 7.

Operation S59. The instant messaging client of the second terminal sends a telephonic session reservation feedback message to the telephonic session server.

Specifically, the instant messaging client of the second terminal generates the telephonic session reservation feedback message when detecting that the user accepts the telephonic session invitation, and sends the telephonic session reservation feedback message to the telephonic session server.

For example, on the interface shown in FIG. 7, the instant messaging client of the second terminal generates the telephonic session reservation feedback message when detecting that the user clicks an "accept" button, and sends the telephonic session reservation feedback message to the telephonic session server.

Operation S510. The telephonic session server updates the reservation information according to the received telephonic session reservation feedback message.

Specifically, the telephonic session server updates the telephonic session initiation condition in the reservation information according to the updating condition information in the telephonic session reservation feedback message. For example, if the telephonic session initiation condition is from a current time to a preset telephonic session initiating time and the updating condition information in the telephonic session reservation feedback message is time information, the telephonic session server updates the telephonic session initiating time according to the time information in the telephonic session reservation feedback message.

In addition, the telephonic session server obtains a joint identity in the telephonic session reservation feedback message, converts the joint identity, and adds a telephonic session user identity obtained after the conversion to the reservation information.

Operation S511. The telephonic session server sends a reservation updating message to the telephonic session client of the first terminal.

Operation S512. The telephonic session server sends a telephonic session initiation request to the telephonic session client of the first terminal and a telephonic session client of the second terminal according to the reservation information when a telephonic session initiation condition is satisfied.

Specifically, when the telephonic session initiation condition in the reservation information is satisfied, the telephonic session server sends, according to the telephonic session user identity in the reservation information, the telephonic session initiation request to the telephonic session client of the first terminal and the telephonic session client corresponding to the instant messaging client of the second terminal. That is, the telephonic session server sends the telephonic session initiation request to the telephonic session client of the first terminal and the telephonic session client of the second terminal.

Operation S513. Establish a telephonic session between the telephonic session client of the first terminal and the telephonic session client of the second terminal.

It should be noted that the telephonic session reservation feedback message may include the joint identity and the updating condition information, or may include the joint identity, but does not include the updating condition information. When the telephonic session reservation feedback message does not include the updating condition information, the telephonic session server does not update the telephonic session initiation condition in the reservation information and does not send the reservation updating information to the telephonic session client of the first terminal either.

In this embodiment of the present disclosure, reservation information is set on a telephonic session server and a telephonic session is automatically initiated by the telephonic session server according to the reservation information. In this way, a user can customize factors, such as telephonic session time and telephonic session content, and extensibility of a multi-people telephonic session is implemented. Therefore, a user does not need to laboriously memorize a telephonic session to be initiated, thereby greatly improving user experience. In addition, the reservation information may be arbitrarily propagated in a closed-loop between a telephonic session client and an instant messaging client by making the instant messaging client compatible in a multi-people telephonic session, so as to achieve cross-platform propagation and telephonic session, expand a propagation range of the multi-people telephonic session, and improve compatibility of the multi-people telephonic session.

Figure 8:
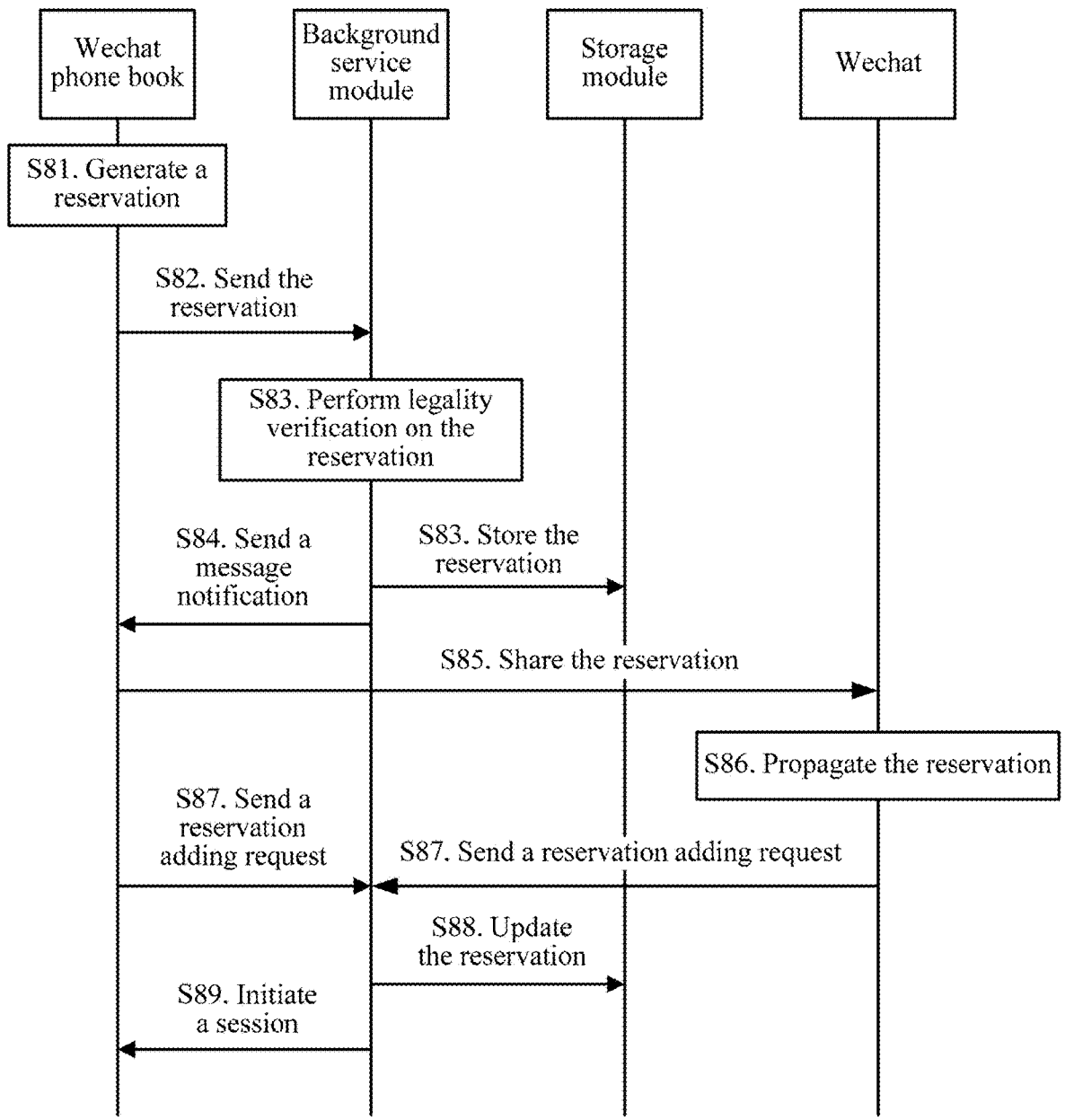
FIG. 8 is a flowchart of another telephonic session initiation method according to an embodiment of the present disclosure.

As shown in FIG. 8, an embodiment of the present disclosure further provides another automatic telephonic session initiation method, applied to a system including WeChat, WeChat phone book (that is, a telephonic session client), a background service module, and a storage module. The method includes the following steps:

Operation S81. A WeChat phone book generates a reservation according to a contact selected by a user and a telephonic session initiation condition.

For example, when the user selects contacts A, B, and C as invitees, and sets that the telephonic session initiation condition is from a current time to 15:02, the WeChat phone book generates the reservation according to the foregoing information.

Operation S82. A WeChat phone book sends the reservation to the background service module.

Operation S83. The background service module checks legality of the reservation and stores the reservation in the storage module.

Specifically, the background service module performs legality verification on content and a number of persons of the reservation and stores the reservation in the storage module after verification succeeds.

For example, the background service module stores the invitees A, B, and C and the telephonic session initiation condition that is from a current time to 15:02 in the storage module.

Operation S84. The background service module sends a message notification to the WeChat phone book corresponding to the contacts in the reservation.

For example, the background service module sends a reservation notification to the WeChat phone book corresponding to the invitees A, B, and C. The reservation notification includes information of the invitees A, B, and C and the telephonic session initiation condition that is from a current time to 15:02.

Operation S85. The WeChat phone book shares the reservation in WeChat.

Operation S86. The WeChat propagates the reservation.

For example, the WeChat may propagate the reservation by using WeChat messages to make the reservation more widely known.

Operation S87. The WeChat and the WeChat phone book send a reservation adding request to the background service module.

For example, users receiving the reservation by using the WeChat messages may send the reservation adding request to the background service module by using WeChat; users receiving the reservation by using the WeChat phone book may send the reservation adding request to the background service module by using the WeChat phone book.

Operation S88. The background service module updates the reservation in the storage module.

For example, when the reservation adding request received by the background service module includes time information 15:34, the telephonic session initiation condition is modified to from a current time to 15:34.

Operation S89. The background service module initiates a telephonic session when the telephonic session initiation condition is satisfied.

For example, the background service module initiates a telephonic session according to the contacts in the reservation when the current time is 15:34.

In this embodiment of the present disclosure, a reservation is set on a background service module and a telephonic session is automatically initiated by the background service module according to the reservation. In this way, a user can customize factors, such as telephonic session time and telephonic session content, and extensibility of a multi-people telephonic session is implemented. Therefore, a user does not need to laboriously memorize a telephonic session to be initiated, thereby greatly improving user experience. In addition, the reservation information may be arbitrarily propagated in a closed-loop between a telephonic session client and an instant messaging client by making the instant messaging client compatible in a multi-people telephonic session, so as to achieve cross-platform propagation and telephonic session, expand a propagation range of the multi-people telephonic session, and improve compatibility of the multi-people telephonic session.

Figure 9:
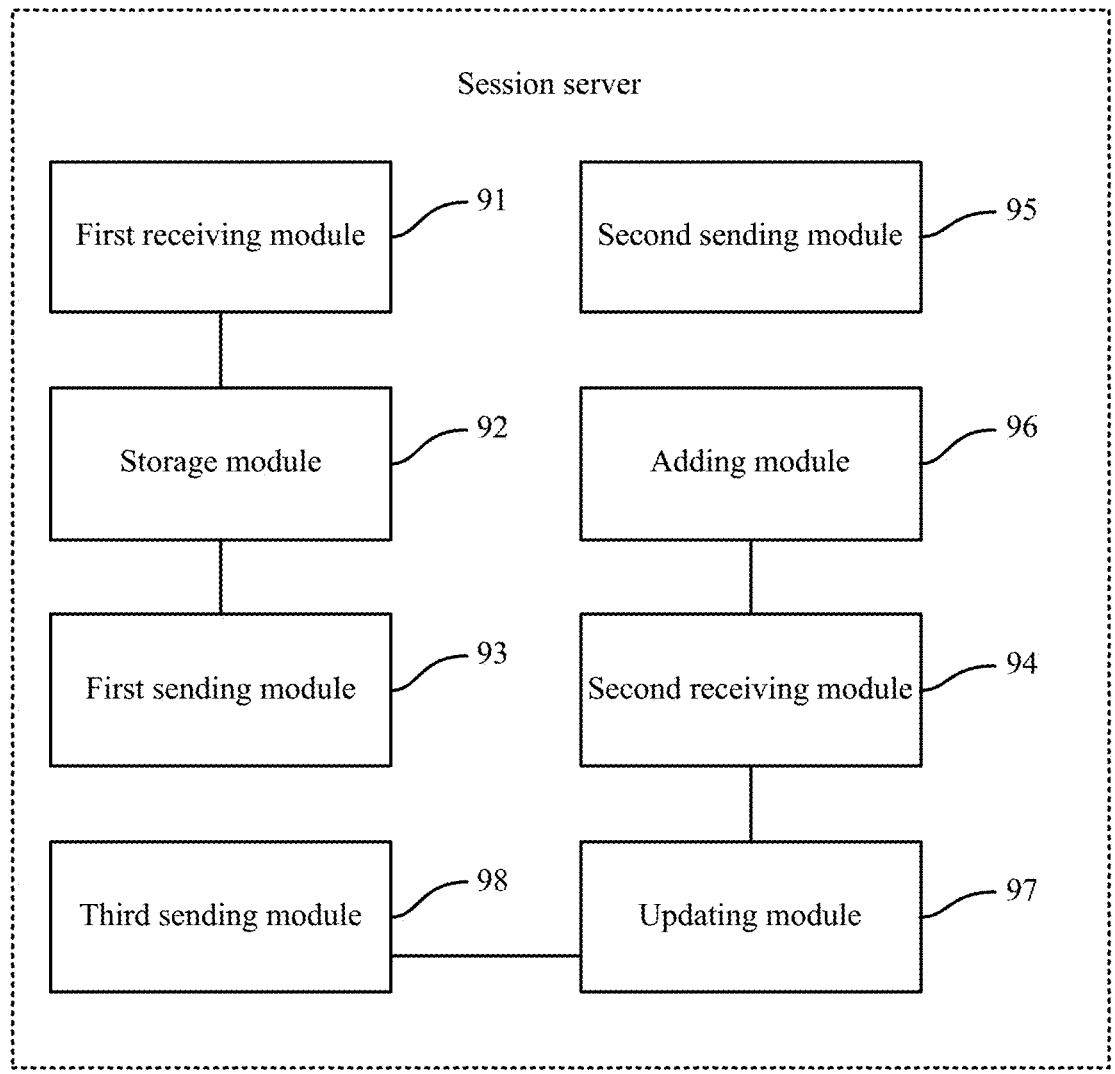
FIG. 9 is a schematic structural diagram of a telephonic session server according to an embodiment of the present disclosure.

Based on the foregoing automatic telephonic session initiation method, as shown in FIG. 9, an embodiment of the present disclosure further provides a telephonic session server, including:

a first receiving module 91, configured to receive a telephonic session reservation request from a telephonic session client of a first terminal;

a storage module 92, configured to store corresponding reservation information according to the telephonic session reservation request;

a first sending module 93, configured to send the reservation information to an instant messaging client of a second terminal by using an instant messaging client of the first terminal;

a second receiving module 94, configured to receive a telephonic session reservation feedback message from the instant messaging client of the second terminal; and a second sending module 95, configured to send a telephonic session initiation request to the telephonic session client of the first terminal and a telephonic session client of the second terminal according to the reservation information when a telephonic session initiation condition is satisfied.

The reservation information includes a telephonic session user identity; accordingly, the second sending module 95 is specifically configured to send the telephonic session initiation request to the telephonic session client of the first terminal and the telephonic session client of the second terminal according to the telephonic session user identity in the reservation information when the telephonic session initiation condition is satisfied.

Further, the telephonic session server further includes:

an adding module 96, configured to obtain a joint identity in the telephonic session reservation feedback message, convert the joint identity, and add a telephonic session user identity obtained after the conversion to the reservation information.

Further, the telephonic session reservation feedback message includes updating condition information.

Accordingly, the telephonic session server further includes:

an updating module 97, configured to update the telephonic session initiation condition in the reservation information according to the updating condition information in the telephonic session reservation feedback message.

Further, the telephonic session server further includes:

a third sending module 98, configured to send a reservation updating message to the telephonic session client of the first terminal.

In this embodiment of the present disclosure, reservation information is set on a telephonic session server and a telephonic session is automatically initiated by the telephonic session server according to the reservation information. In this way, a user can customize factors, such as telephonic session time and telephonic session content, and extensibility of a multi-people telephonic session is implemented. Therefore, a user does not need to laboriously memorize a telephonic session to be initiated, thereby greatly improving user experience. In addition, the reservation information may be arbitrarily propagated in a closed-loop between a telephonic session client and an instant messaging client by making the instant messaging client compatible in a multi-people telephonic session, so as to achieve cross-platform propagation and telephonic session, expand a propagation range of the multi-people telephonic session, and improve compatibility of the multi-people telephonic session.

Figure 10:
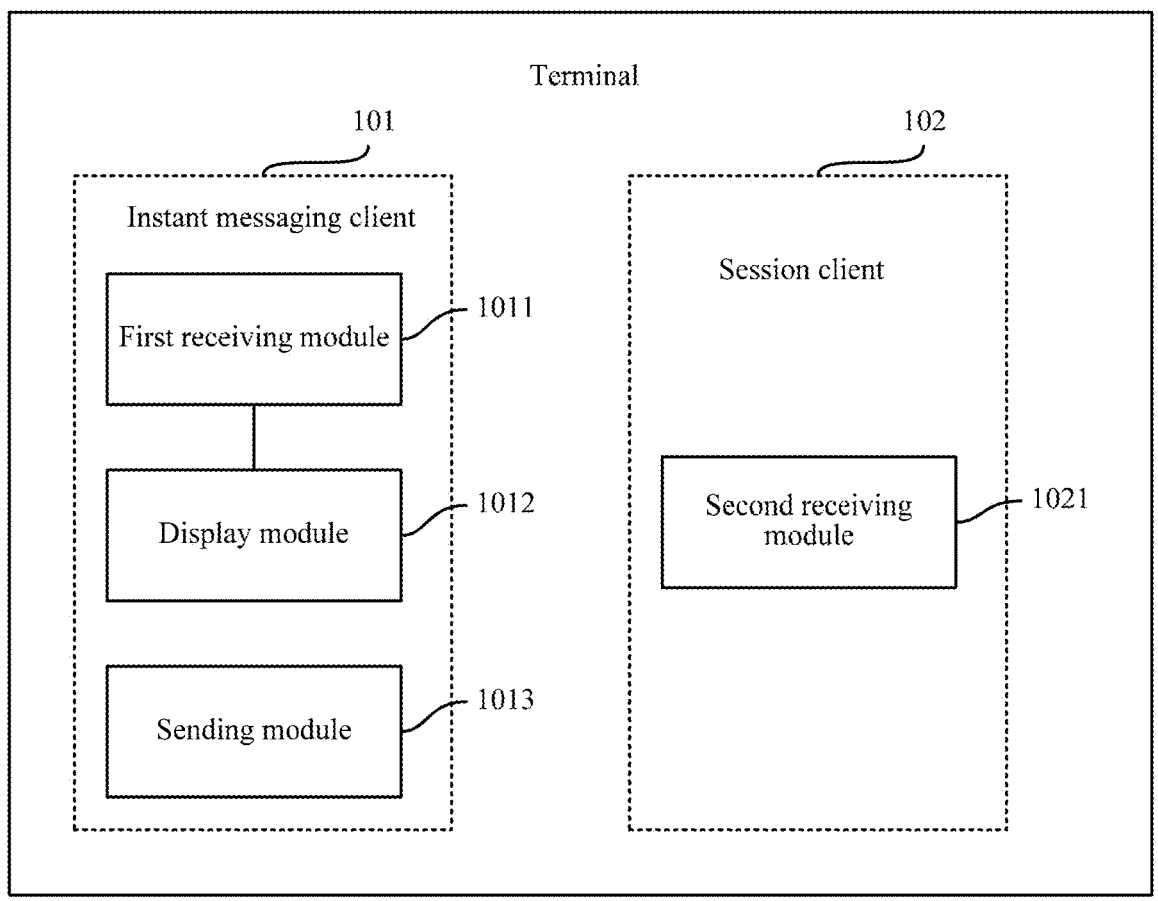
FIG. 10 is a schematic structural diagram of a terminal according to an embodiment of the present disclosure.

As shown in FIG. 10, an embodiment of the present disclosure further provides a terminal, including an instant messaging client 101 and a telephonic session client 102.

The instant messaging client 101 of the terminal includes:

a first receiving module 1011, configured to receive reservation information from an instant messaging client of another terminal by using an instant messaging server;

a display module 1012, configured to display the reservation information, where the reservation information corresponds to a telephonic session reservation request sent by a telephonic session client of the another terminal to a telephonic session server; and a sending module 1013, configured to send a telephonic session reservation feedback message to the telephonic session server.

The telephonic session reservation feedback message includes a joint identity, the joint identity is converted by the telephonic session server, and a telephonic session user identity obtained after the conversion is added to the reservation information by the telephonic session server.

Further, the telephonic session reservation feedback message includes updating condition information, and the updating condition information is used to update, by the telephonic session server, a telephonic session initiation condition in the reservation information.

The telephonic session client 102 of the terminal includes:

a second receiving module 1021, configured to receive a telephonic session initiation request from the telephonic session server and establish a telephonic session with the telephonic session client of the another terminal.

Figure 11:
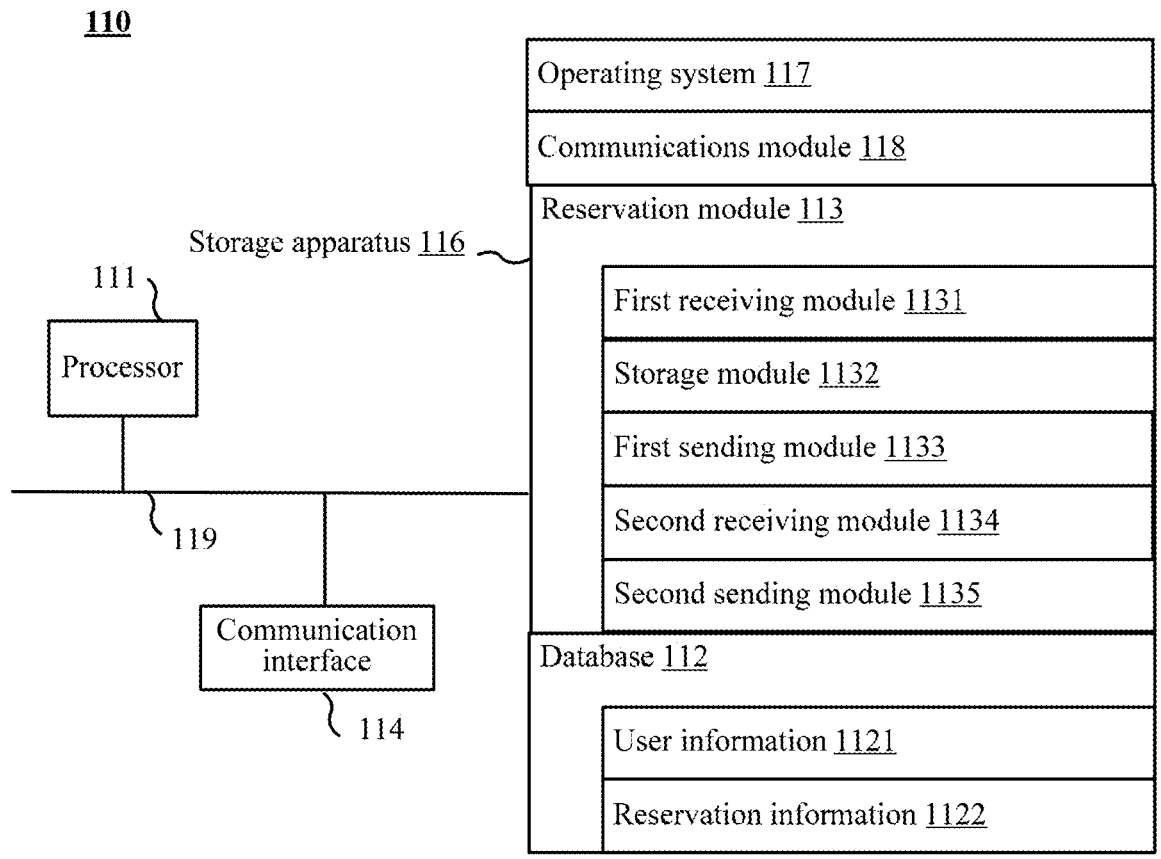
FIG. 11 is a schematic structural diagram of a telephonic session server according to an embodiment of the present disclosure.

FIG. 11 is a schematic structural diagram of a telephonic session server according to an embodiment of the present disclosure. As shown in FIG. 11, the telephonic session server 110 may include a processor 111, a communication interface 114, a storage apparatus 116, and a bus 119. The storage apparatus 116 includes an operating system 117, a communications module 118, a database 112, and a reservation module 113.

There may be one or more processors 111, and the processors 111 may be in one physical device or distributed in multiple physical devices.

The telephonic session server 110 may use the communication interface 114 to receive a reservation request or a reservation feedback submitted by a user by means of a telephonic session client by using a network, and communicate with an IM server by using the communication interface 114.

The database 112 stores user information 1121 (for example, registration information and identification information) in the telephonic session system, and reservation information 1122 corresponding to each reservation request.

The reservation module 113 may include the following modules:

a first receiving module 1131, configured to receive a telephonic session reservation request from a telephonic session client of a first terminal;

a storage module 1132, configured to store corresponding reservation information according to the telephonic session reservation request;

a first sending module 1133, configured to send the reservation information to an instant messaging client of a second terminal by using an instant messaging client of the first terminal;

a second receiving module 1134, configured to receive a telephonic session reservation feedback message from the second terminal; and a second sending module 1135, configured to send a telephonic session initiation request to the telephonic session client of the first terminal and a telephonic session client of the second terminal according to the reservation information when a telephonic session initiation condition is satisfied.

The reservation module 113 may implement functions of the telephonic session server in the foregoing examples, and details are not described herein again.

Figure 12:
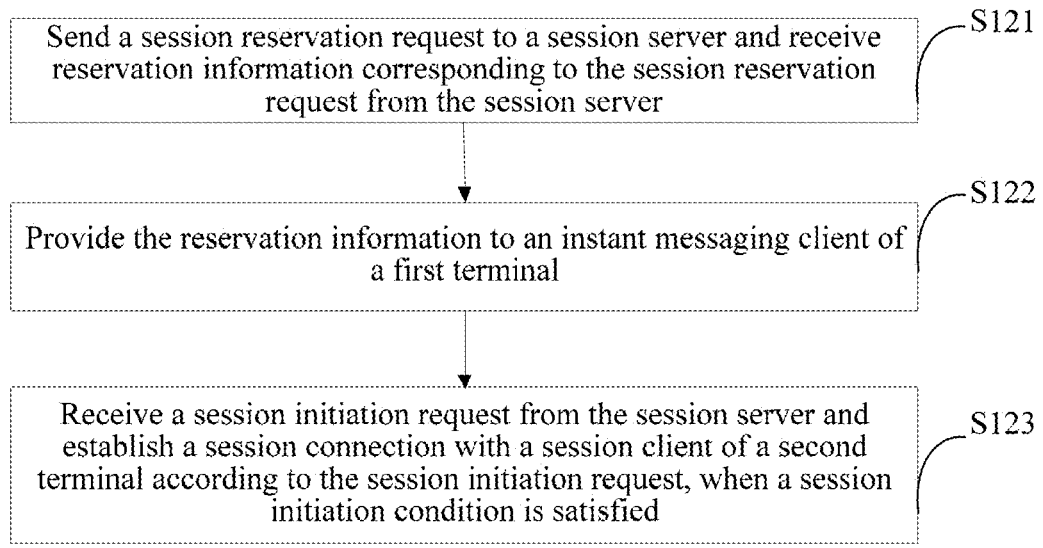
FIG. 12 is a flowchart of a telephonic session initiation method according to an embodiment of the present disclosure.

FIG. 12 is a flowchart of a telephonic session initiation method according to an embodiment of the present disclosure. In the example, the telephonic session client in the first terminal performs the method. As shown in FIG. 12, the method 120 may include the following steps:

Operation S121. Send a telephonic session reservation request to a telephonic session server and receive reservation information corresponding to the telephonic session reservation request from the telephonic session server.

Operation S122. Provide the reservation information to an instant messaging client of a first terminal.

Operation S123. Receive a telephonic session initiation request from the telephonic session server and establish a telephonic session with a telephonic session client of a second terminal according to the telephonic session initiation request, when a telephonic session initiation condition is satisfied.

In some examples, a link used to access the reservation information is obtained from the telephonic session server, and the link is provided to the instant messaging client of the first terminal.

In this embodiment of the present disclosure, an instant messaging client of a terminal sends a telephonic session reservation feedback message to a telephonic session server, and a telephonic session client of the terminal receives a telephonic session initiation request from the telephonic session server, to automatically initiate a telephonic session. Therefore, a user does not need to laboriously memorize a telephonic session to be initiated, thereby greatly improving user experience. In addition, the reservation information may be arbitrarily propagated in a closed-loop between a telephonic session client and an instant messaging client by making the instant messaging client compatible in a multi-people telephonic session, so as to achieve cross-platform propagation and telephonic session, expand a propagation range of the multi-people telephonic session, and improve compatibility of the multi-people telephonic session.

It should be noted that, all steps and modules in the foregoing procedures and structural diagrams are not necessary, and some steps or modules may be omitted according to actual needs. An execution sequence of the steps is not fixed, and may be adjusted according to needs. Division of the modules is merely functional division for ease of description. In actual implementation, one module may be implemented separately by multiple modules, and functions of multiple modules may also be implemented by one same module. The modules may be located in a same device, and may also be located in different devices. In addition, "first" and "second" as described above are just for convenience of distinguishing two objects that have a same meaning. It does not mean that there is a substantial difference.

Hardware modules in the embodiments may be implemented in a mechanic manner or an electronic manner. For example, a hardware module may include a specifically designed permanent circuit or logical device (for example, a dedicated processor, such as an FPGA or an ASIC) for completing a specific operation. The hardware module may also include a programmable logical device or circuit (for example, including a general processor or another programmable processor) configured temporarily by software and configured to execute a specific operation. Whether the hardware module is specifically implemented in a mechanic manner, by using a dedicated permanent circuit, or by using a temporarily-configured circuit (for example, configured by software) may be determined according to considerations of costs and time.

The present disclosure further provides a non-transitory computer readable storage medium, which stores an instruction that is used to make a machine to execute the method described in this specification. Specifically, a system or an apparatus that is equipped with a storage medium may be provided. The storage medium stores software program code that implements functions of any embodiment in the foregoing embodiments, and a computer (a CPU or an MPU) of the system or the apparatus is enabled to read and execute the program code stored in the storage medium. In addition, a program code based instruction may also be used to enable an operating system or the like running in the computer to complete some or all actual operations.

Embodiments of the non-transitory computer readable storage medium for providing the program code may include a floppy disk, a hard disk, a magneto-optical disk, an optical memory (such as a CD-ROM, a CD-R, a CD-RW, a DVD-ROM, a DVD-RAM, a DVD-RW, and a DVD+RW), a magnetic tape, a non-volatile storage card, and a ROM. Optionally, the program code may be downloaded from a server computer by using a communications network.

In conclusion, the scope of the claims should not be limited to the implementation manners in the foregoing described examples, but instead the specification should be considered as a whole and a broadest interpretation should be given.

What is claimed is:

1. A method for automatically reserving a multi-people telephonic session among contacts of a first member of an instant messaging (IM) application performed at a server system including a telephonic session server and an instant messaging (IM) server, each server having one or more processors and memory storing one or more programs to be executed by the one or more processors, the method comprising:

receiving, by the telephonic session server, a multi-people telephonic session reservation request from a telephonic session client of a first terminal associated with the first member of the IM application, wherein the multi-people telephonic session reservation request identifies a start time of the multi-people telephonic session;

generating, by the telephonic session server, corresponding reservation information according to the multi-people telephonic session reservation request;

sending, by the telephonic session server, the reservation information to the instant messaging client of the first terminal;

receiving, by the IM server, the reservation information and identifiers of multiple contacts of the first member of the IM application, wherein the multiple contacts of the first member of the IM application were selected by the first member at the instant messaging client of the first terminal as invitees of the multi-people telephonic session;

sending, by the IM server, the reservation information to the instant messaging client of a respective terminal associated with a corresponding invitee contact of the first member of the IM application, wherein the reservation information is displayed as a text message, in an online chat between the instant messaging client of the first terminal and the instant messaging client of the respective terminal;

receiving, by the telephonic session server, a telephonic session reservation feedback message from the instant messaging client of a respective terminal whose associated invitee contact of the first member of the IM application has accepted the reservation information through the online chat between the instant messaging client of the first terminal and the instant messaging client of the respective terminal; and in accordance with a determination that the start time of the multi-people telephonic session has begun, automatically initiating, by the telephonic session server, a multi-people telephonic session among the first member and the invitee contacts of the first member who have accepted the reservation information, wherein the automatically initiating comprises:

sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals, and establishing a multi-person telephonic session on the multi-person telephonic session interface in response to an acceptance of the telephonic session initiation request by the telephonic session client of any of the respective terminals.

2. The method according to claim 1, wherein the sending, by the telephonic session server, the reservation information to the instant messaging client of the first terminal comprises:

generating, by the telephonic session server, a link associated with the reservation information; and providing, by the telephonic session server, the link to the instant messaging client of the first terminal, wherein the instant messaging client of the first terminal of the first member is configured to send a text message including the link associated with the reservation information to the instant messaging client of a respective terminal according to the identifier of the corresponding invitee contact of the first member of the respective terminal via the IM server.

3. The method according to claim 1, wherein the receiving, by the telephonic session server, a telephonic session reservation feedback message from the instant messaging client of a respective terminal further comprises:
    forwarding, by the telephonic session server, the telephonic session reservation feedback message from the instant messaging client of the respective terminal whose associated invitee contact of the first member of the IM application has accepted the reservation information to the instant messaging client of the first terminal.

4. The method according to claim 3, wherein the receiving, by the telephonic session server, a telephonic session reservation feedback message from the instant messaging client of a respective terminal further comprises:
    receiving, by the telephonic session server, an update to the reservation information from the instant messaging client of the respective terminal whose associated invitee contact of the first member of the IM application has accepted the reservation information;
    updating, by the telephonic session server, the reservation information according to the update; and
    forwarding, by the telephonic session server, the updated reservation information to the instant messaging client of the first terminal for display, as a text message, in the online chat between the instant messaging client of the first terminal and the instant messaging client of the respective terminal.

5. The method according to claim 4, wherein after the forwarding, by the telephonic session server, the updated reservation information to the instant messaging client of the first terminal for display, as a text message, in the online chat between the instant messaging client of the first terminal and the instant messaging client of the respective terminal, the method further comprises:
    receiving, by the telephonic session server, an update confirmation from the instant messaging client of the first terminal; and
    forwarding, by the telephonic session server, the update confirmation to the instant messaging client of the respective terminal for display, as a text message, in the online chat between the instant messaging client of the first terminal and the instant messaging client of the respective terminal.

6. The method according to claim 1, wherein the reservation information comprises multiple telephonic session user identities for the multi-people telephonic session; and
    the sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals comprises:
    sending, by the telephonic session server, the telephonic session initiation request to the telephonic session client of the first terminal and the telephonic session client of the second terminal according to the multiple telephonic session user identities in the reservation information.

7. The method according to claim 1, wherein after the sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals, the method further comprises:
    obtaining, by the telephonic session server, a telephonic session postpone request from the instant messaging client of a respective terminal of a corresponding invitee contact of the first member who has accepted the reservation information;
    updating, by the telephonic session server, the reservation information according to the telephonic session postpone request; and
    forwarding, by the telephonic session server, the updated reservation information to the instant messaging client of the first terminal.

8. The method according to claim 7, wherein after the forwarding, by the telephonic session server, the updated reservation information to the instant messaging client of the first terminal, the method further comprises:
    receiving, by the telephonic session server, an update confirmation from the instant messaging client of the first terminal; and
    forwarding, by the telephonic session server, the update confirmation to the instant messaging client of a respective terminal of a corresponding invitee contact of the first member who has accepted the reservation information.

9. A server system including a telephonic session server and an instant messaging (IM) server, each server, comprising:
    one or more processors;
    memory; and
    one or more programs stored in the memory that, when executed by the one or more processors, cause the telephonic session server or the IM server to perform a plurality of operations including:
        receiving, by the telephonic session server, a multi-people telephonic session reservation request from a telephonic session client of a first terminal associated with the first member of the IM application, wherein the multi-people telephonic session reservation request identifies a start time of the multi-people telephonic session;
        generating, by the telephonic session server, corresponding reservation information according to the multi-people telephonic session reservation request;
        sending, by the telephonic session server, the reservation information to the instant messaging client of the first terminal;
        receiving, by the IM server, the reservation information and identifiers of multiple contacts of the first member of the IM application, wherein the multiple contacts of the first member of the IM application were selected by the first member at the instant messaging client of the first terminal as invitees of the multi-people telephonic session;
        sending, by the IM server, the reservation information to the instant messaging client of a respective terminal associated with a corresponding invitee contact of the first member of the IM application, wherein the reservation information is displayed as a text message, in an online chat between the instant messaging client of the first terminal and the instant messaging client of the respective terminal;

receiving, by the telephonic session server, a telephonic session reservation feedback message from the instant messaging client of a respective terminal whose associated invitee contact of the first member of the IM application has accepted the reservation information through the online chat between the instant messaging client of the first terminal and the instant messaging client of the respective terminal; and in accordance with a determination that the start time of the multi-people telephonic session has begun, automatically initiating, by the telephonic session server, a multi-people telephonic session among the first member and the invitee contacts of the first member who have accepted the reservation information, wherein the automatically initiating comprises:

sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals, and establishing a multi-person telephonic session on the multi-person telephonic session interface in response to an acceptance of the telephonic session initiation request by the telephonic session client of any of the respective terminals.

10. The server system according to claim 9, wherein the sending, by the telephonic session server, the reservation information to the instant messaging client of the first terminal comprises:

generating, by the telephonic session server, a link associated with the reservation information; and providing, by the telephonic session server, the link to the instant messaging client of the first terminal, wherein the instant messaging client of the first terminal of the first member is configured to send a text message including the link associated with the reservation information to the instant messaging client of a respective terminal according to the identifier of the corresponding invitee contact of the first member of the respective terminal via the IM server.

11. The server system according to claim 9, wherein the receiving, by the telephonic session server, a telephonic session reservation feedback message from the instant messaging client of a respective terminal further comprises:

forwarding, by the telephonic session server, the telephonic session reservation feedback message from the instant messaging client of the respective terminal whose associated invitee contact of the first member of the IM application has accepted the reservation information to the instant messaging client of the first terminal.

12. The server system according to claim 9, wherein the reservation information comprises multiple telephonic session user identities for the multi-people telephonic session; and the sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals comprises:

sending, by the telephonic session server, the telephonic session initiation request to the telephonic session client of the first terminal and the telephonic session client of the second terminal according to the multiple telephonic session user identities in the reservation information.

13. The server system according to claim 9, wherein after the sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals, the plurality of operations further comprise:

obtaining, by the telephonic session server, a telephonic session postpone request from the instant messaging client of a respective terminal of a corresponding invitee contact of the first member who has accepted the reservation information;

updating, by the telephonic session server, the reservation information according to the telephonic session postpone request; and forwarding, by the telephonic session server, the updated reservation information to the instant messaging client of the first terminal.

14. A non-transitory computer readable storage medium, comprising one or more programs that, when executed by one or more processors of a server system including a telephonic session server and an instant messaging (IM) server, cause the telephonic session server or the IM server to perform a plurality of operations including:

receiving, by the telephonic session server, a multi-people telephonic session reservation request from a telephonic session client of a first terminal associated with the first member of the IM application, wherein the multi-people telephonic session reservation request identifies a start time of the multi-people telephonic session;

generating, by the telephonic session server, corresponding reservation information according to the multi-people telephonic session reservation request;

sending, by the telephonic session server, the reservation information to the instant messaging client of the first terminal;

receiving, by the IM server, the reservation information and identifiers of multiple contacts of the first member of the IM application, wherein the multiple contacts of the first member of the IM application were selected by the first member at the instant messaging client of the first terminal as invitees of the multi-people telephonic session;

sending, by the IM server, the reservation information to the instant messaging client of a respective terminal associated with a corresponding invitee contact of the first member of the IM application, wherein the reservation information is displayed as a text message, in an online chat between the instant messaging client of the first terminal and the instant messaging client of the respective terminal;

receiving, by the telephonic session server, a telephonic session reservation feedback message from the instant messaging client of a respective terminal whose associated invitee contact of the first member of the IM application has accepted the reservation information through the online chat between the instant messaging client of the first terminal and the instant messaging client of the respective terminal; and in accordance with a determination that the start time of the multi-people telephonic session has begun, automatically initiating, by the telephonic session server, a multi-people telephonic session among the first member and the invitee contacts of the first member who have accepted the reservation information, wherein the automatically initiating comprises:

sending, by the telephonic session server, a telephonic session initiation request to the telephonic session client of the first terminal and the telephonic session clients of the respective terminals of invitee contacts of the first member who have accepted the reservation information according to the reservation information for causing display of a multi-person telephonic session interface on the terminals, and establishing a multi-person telephonic session on the multi-person telephonic session interface in response to an acceptance of the telephonic session initiation request by the telephonic session client of any of the respective terminals.

15. The non-transitory computer readable storage medium according to claim 14, wherein the sending, by the telephonic session server, the reservation information to the instant messaging client of the first terminal comprises:

generating, by the telephonic session server, a link associated with the reservation information; and providing, by the telephonic session server, the link to the instant messaging client of the first terminal, wherein the instant messaging client of the first terminal of the first member is configured to send a text message including the link associated with the reservation information to the instant messaging client of a respective terminal according to the identifier of the corresponding invitee contact of the first member of the respective terminal via the IM server.

16. The non-transitory computer readable storage medium according to claim 14, wherein the receiving, by the telephonic session server, a telephonic session reservation feedback message from the instant messaging client of a respective terminal further comprises forwarding, by the telephonic session server, the telephonic session reservation feedback message from the instant messaging client of the respective terminal whose associated invitee contact of the first member of the IM application has accepted the reservation information to the instant messaging client of the first terminal.

* * * * *